United States Patent
Kang et al.

(10) Patent No.: US 7,168,046 B2
(45) Date of Patent: Jan. 23, 2007

(54) METHOD AND APPARATUS FOR ASSISTING DATA INPUT TO A PORTABLE INFORMATION TERMINAL

(75) Inventors: Yun Gyu Kang, Koompo-si (KR); Byung Hak Jung, Seoul (KR); Yong Soo Shin, Anyang-si (KR); Su Young Pan, Seoul (KR); Sang Bum Kim, Goyang-si (KR); Seung Ho Lee, Koonpo-si (KR)

(73) Assignee: LG Electronics Inc., Seoul (KR)

( * ) Notice: Subject to any disclaimer, the term of this patent is extended or adjusted under 35 U.S.C. 154(b) by 466 days.

(21) Appl. No.: 10/131,044

(22) Filed: Apr. 25, 2002

(65) Prior Publication Data

US 2002/0167545 A1   Nov. 14, 2002

(30) Foreign Application Priority Data

Apr. 26, 2001  (KR) ............................... 2001-22694
May 15, 2001  (KR) ............................... 2001-26562

(51) Int. Cl.
G06F 3/00  (2006.01)
(52) U.S. Cl. ....................................... 715/773; 715/771
(58) Field of Classification Search ................ 715/773, 715/771, 764
See application file for complete search history.

(56) References Cited

U.S. PATENT DOCUMENTS

| | | | |
|---|---|---|---|
| 5,805,157 A * | 9/1998 | Bertram et al. | 715/773 |
| 5,839,112 A * | 11/1998 | Schreitmueller et al. | 705/4 |
| 6,661,920 B1 * | 12/2003 | Skinner | 382/187 |
| 6,677,933 B1 * | 1/2004 | Yogaratnam | 345/174 |
| 6,714,220 B2 * | 3/2004 | Sigl | 715/780 |

* cited by examiner

Primary Examiner—Raymond J. Bayerl
Assistant Examiner—Dennis G. Bonshock
(74) Attorney, Agent, or Firm—Fleshner & Kim, LLP

(57) ABSTRACT

A method and apparatus for providing a suitable soft keyboard for end users to conveniently enter data to a portable information terminal that can not provide concurrently multiple character set keyboards, such as Korean, English, and Numeric keyboards. A data input assisting method displays an input window including a plurality of input fields when data input is requested. The input window identifies an input data set among English, Numeric, and non-English character sets suitable to an input field, which is selected for information input on the displayed input window, and provides a soft keyboard of touch screen or the like including the identified character set. Therefore, data input is ensured when a user must select and enter non-English (e.g., Korean), English, or Numeric data to match information type of each data field to be stored in a portable information terminal, such as a Personal Digital Assistant (PDA).

21 Claims, 6 Drawing Sheets special keys assigned to switchover among soft keyboards both selecting concurrently or at a
short interval functions switchover
among several soft keyboards

*special keys assigned to switchover among soft keyboards*

*Soft Keyboard including Numeric Character Set*

*both selecting concurrently or at a short interval functions switchover among several soft keyboards*

*special keys assigned to switchover among soft keyboards*

*Soft Keyboard including English Character Set*

*both selecting concurrently or at a short interval functions switchover among several soft keyboards*

*special keys assigned to switchover among soft keyboards*

METHOD AND APPARATUS FOR ASSISTING DATA INPUT TO A PORTABLE INFORMATION TERMINAL

BACKGROUND OF THE INVENTION

1. Field of the Invention

The present invention relates to a data input assisting method and apparatus of a portable information terminal, more particularly, to a method and apparatus for providing a suitable soft keyboard of character type data which can be conveniently entered by a user to a portable information terminal, such as a Personal Digital Assistant (PDA).

2. Background of the Related Art

Modern technology development has made a cellular phone and a PCS phone (called 'mobile' phone, hereinafter) much smaller, lighter and cheaper. Thus, a mobile phone is very popular and widely utilized.

In these days, various mobile information terminals other than the popular mobile phone are being introduced to the market. Among those mobile information terminals, a PDA stands in the spotlight for consumers.

The PDA, in general, consists of a CPU, which is a core device of a computer, memories, I/O devices, Operating System (O/S), and a variety of application programs running based on the O/S. The I/O devices include a touch pad and a wide Liquid Crystal Display (LCD), which has a touch screen installed as another input device. Major functions of the PDA are personal information recording, storing, searching, and communication.

The PDA provides an embedded-in application program capable of storing personal contact information entered by a user through the input device and capable of searching all entries of personal contact information for a particular contact information. A contact entry is generally including several fields, such as name, address, position in company, telephone number, e-mail, etc.

A related art user's information input for a contact entry will now be described. When a user requests input of a contact entry, the PDA executes a suitable application program that manages the user's contact information. The application program outputs an input window in which all necessary fields are prepared. Then, the user will sequentially enter the proper information in each field.

If a user, who is a Korean, wants to enter in the name field a Korean name, he or she first needs to activate 'Korean' soft keyboard on the touch screen by pressing a special key on the touch pad or on a previous soft keyboard. As a result, the 'Korean' soft keyboard is displayed on the touch screen. Then, a user touches proper keys on the 'Korean' soft keyboard sequentially with a pen. The characters assigned to the touched keys are entered in the name field. After data are entered completely in the name field, the user wants to enter information in the telephone field, he or she then needs to activate 'Numeric' soft keyboard on the touch screen. If a user needs to enter information in the e-mail field, he or she has to activate 'English' soft keyboard. After a soft keyboard has changed into a suitable one at the user's request, the user can then enter desired information in the corresponding field.

However, the related art data inputting method must select and display a soft keyboard suitable for character type data entering on the touch screen through user manual selection before the user can enter desired data in the corresponding field as described above. Namely, the 'Korean' soft keyboard must be displayed for the fields of name and address, the 'Numeric' soft keyboard for the fields of mobile phone, telephone, facsimile, etc., and the 'English' soft keyboard for the fields of e-mail. Needless to say that data entering operations for all fields are somewhat tedious and time consuming.

SUMMARY OF THE INVENTION

An object of the invention is to solve at least the above problems and/or disadvantages and to provide at least the advantages described hereinafter.

It is an object of the present invention to provide a data input assisting method and apparatus of a portable information terminal that determines which character set is to be used for a particular field and activates a data entry device such as a soft keyboard of the determined character set to be displayed as an input device. When a user selects the particular field, the input data from the character set will be easily or directly completed.

In order to achieve at least the above objects in whole or in part, and in accordance with the purpose of the present invention, as embodied and broadly described, there is provided a method for data input to a portable information terminal, including displaying an input window including a plurality of input fields when data input is requested, identifying which character set of a plurality of character sets is suitable to a selected input field on the displayed input window, and providing a data input screen including the identified character set in response to designation of the selected input field.

To further achieve at least the above objects in whole or in part, and in accordance with the purpose of the present invention, as embodied and broadly described, there is provided a method for data input to a portable information terminal, including displaying an input window including a plurality of input fields when data input is requested, identifying which character set among a plurality of character sets is suitable to a selected input field on the displayed input window, and limiting a search target to the identified character set among all possible character sets.

To further achieve at least the above objects in whole or in part, and in accordance with the purpose of the present invention, as embodied and broadly described, there is provided an apparatus of data input to a portable information terminal, including a display device for displaying an input window including a plurality of selectable input fields when data input is requested, a storing unit for storing information on which character set among a plurality of character sets is suitable to each of the input fields, and a controller device for identifying a suitable character set for a selected input field on the displayed input window based on the information stored in the storing unit, and displaying a data input screen including the identified character set in the display device.

To further achieve at least the above objects in whole or in part, and in accordance with the purpose of the present invention, as embodied and broadly described, there is provided an apparatus of data input to a portable information terminal, including a display that displays an input window including a plurality of input fields when data input is requested, a storing device that stores information on which character set among a plurality of character sets is suitable to each of the input fields, and a controller that identifies which character is entered in a selected input field through searching and comparing an entered character with characters stored in the storing device, and stores the identified character as a piece of information of an input field selected in the input window.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
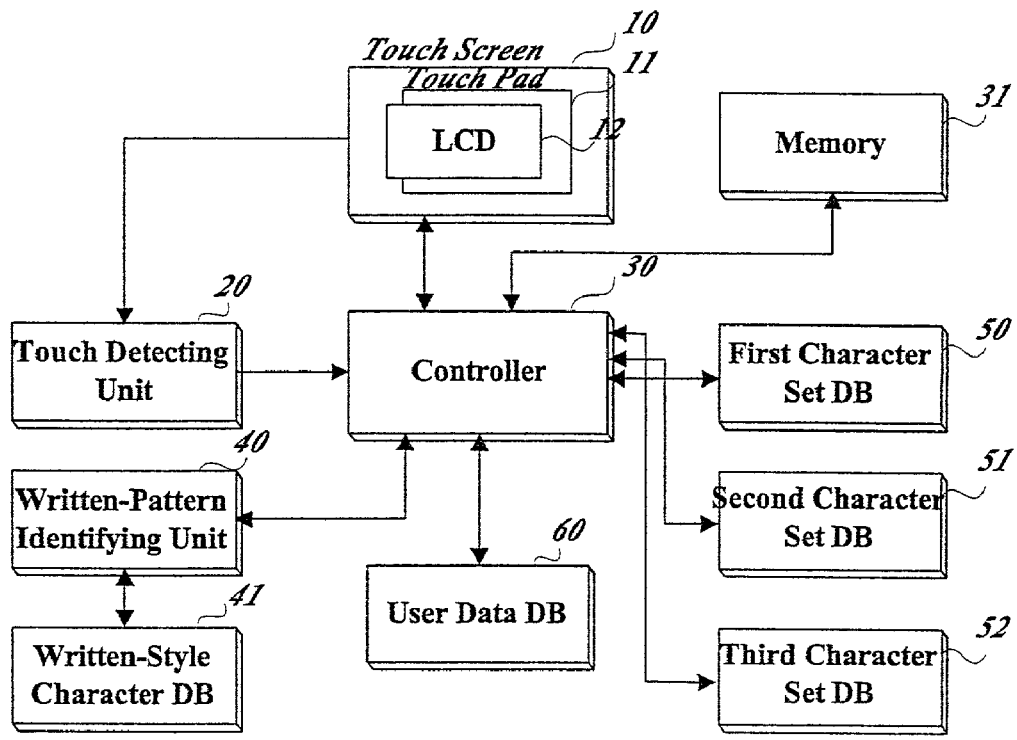
FIG. 1 is a block diagram showing a portable information terminal in which a preferred embodiment of a data input assisting apparatus in accordance with the present invention is embedded.

In order that the invention may be fully understood, preferred embodiments thereof will now be described with reference to the accompanying drawings. FIG. 1 shows a portable information terminal in which a preferred embodiment of a data input assisting apparatus in accordance with the present invention is embedded.

The portable information terminal shown in FIG. 1 includes a touch screen 10 having a touch pad 11 for data entry and a display unit 12 for displaying information, a touch detecting unit 20 receiving signals produced when the touch screen 10 is pressed and calculating an xy coordinate value(s) of the pressed point and a memory 31 storing a variety of application programs and information in which a character set (soft keyboard) is preferably associated with each field of all information items. A written-style character database (DB) 41 stores an information pattern of written-style characters in connection with the codes associated with respective written-style characters. A written-pattern identifying unit 40 is for identifying a written-style character by comparing a pattern formed by xy coordinate value(s) collected while a user writes a character on the touch screen 10 with a pattern information in the written-style character DB 41. Three character set DBs 50, 51, and 52 preferably store respective Korean, Numeric, and English soft keyboards, character codes and the xy coordinate values of all characters of each character set, and a user data DB 60 for storing data information of each field of various user contact information items, such as name, address, e-mail, etc., entered by a user. However, the present invention is not intended to be so limited. Further, a controlling unit 30 conducts overall control of operations of user's field data storing operations, user data DB search operations, information display operations, and so on.

The pattern information about each character stored in the written-style character DB 41 are preferably acquired from recognizing trial-and-errors of many person's writings to make a reduced or the least pattern matching error.

The touch screen 10 including the touch pad 11 and the displaying unit 12 uses a resistance plate where a pressed point has different resistance or a capacitance plate where an electric charge at a pressed point becomes different. The touch detecting unit 20 calculates xy coordinate values corresponding to user's pressing point on the touch screen 10 based on the change of current or voltage in the thin plate covered on the displaying unit 12. The touch detecting unit also detects the number of strokes in a character by counting how many times a press is applied to the touch screen 10. The xy coordinate values collected while a character is being written and the detected number of strokes is used for identifying which character is handwritten or entered on the touch screen 10 by a user.

Figure 2:
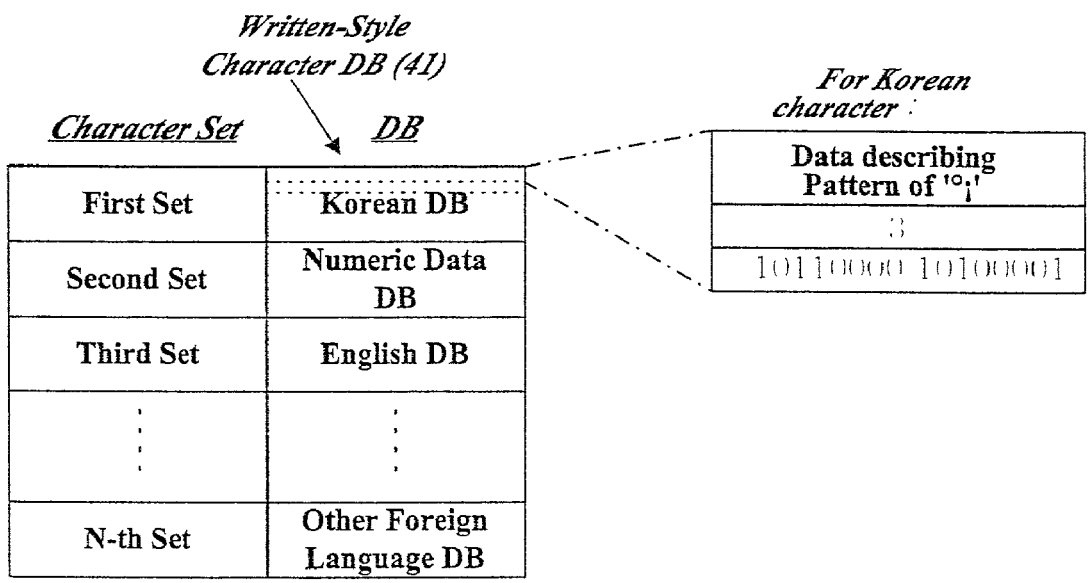
FIG. 2 shows a written-style character memory having separate areas for each character set.

The written-style character DB 41 preferably has separate areas for each character set. As shown in FIG. 2, a Korean character set is stored in the first area, a numeric set in the second, and an English set in the third. Information of each character in the DB 41 further includes pattern information of the character, the number of strokes in the character, and binary code of the character.

Figure 3:
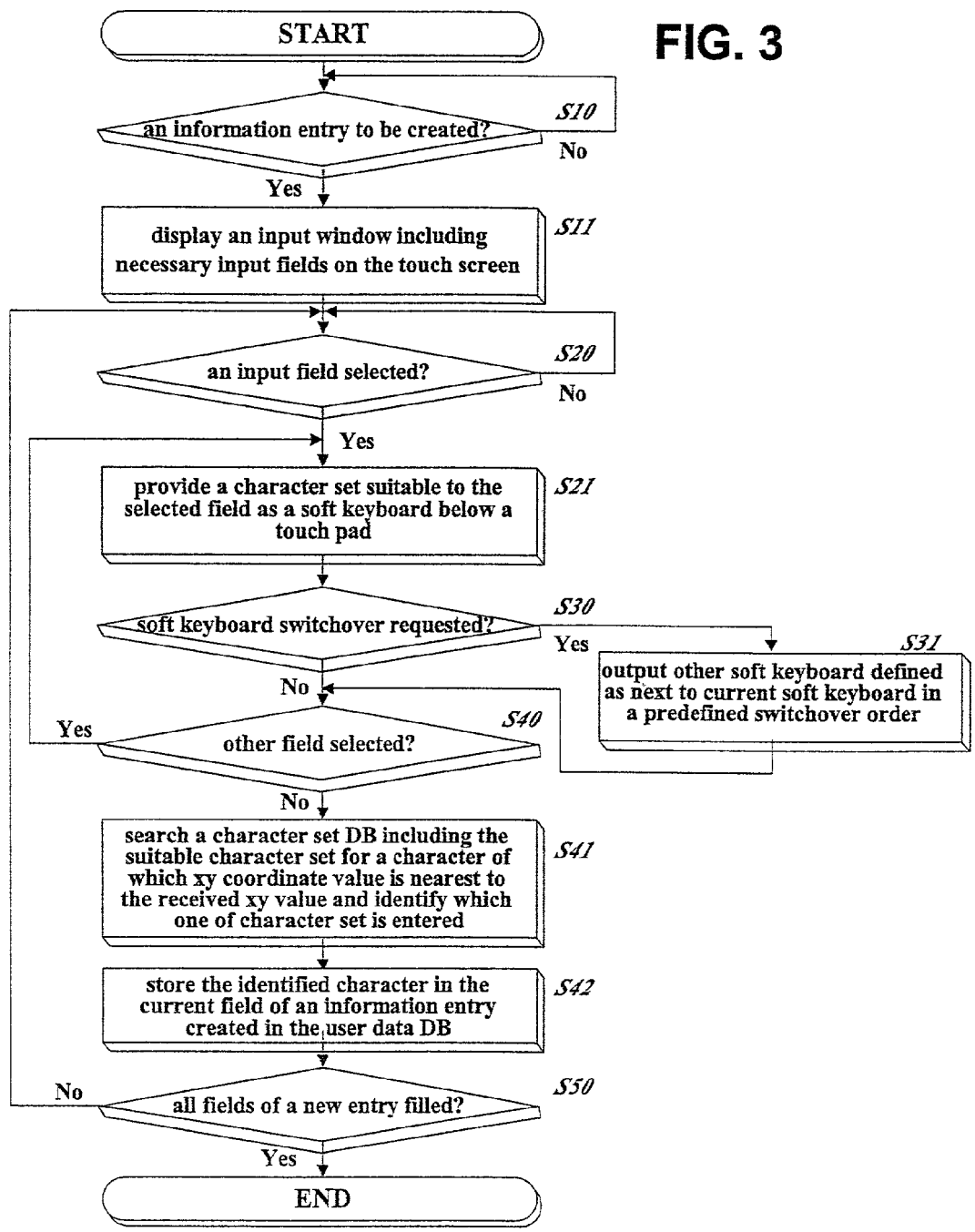
FIG. 3 is a flow chart showing a preferred embodiment of data input assisting method of a portable information terminal in accordance with the present invention.

FIG. 3 is a flow chart showing a preferred embodiment of data input assisting method of a portable information terminal in accordance with the present invention. The procedure depicted in the flow chart of FIG. 3 can be conducted by the portable information terminal shown in FIG. 1 explained below in detail. However, the present invention is not intended to be so limited.

Figure 4:
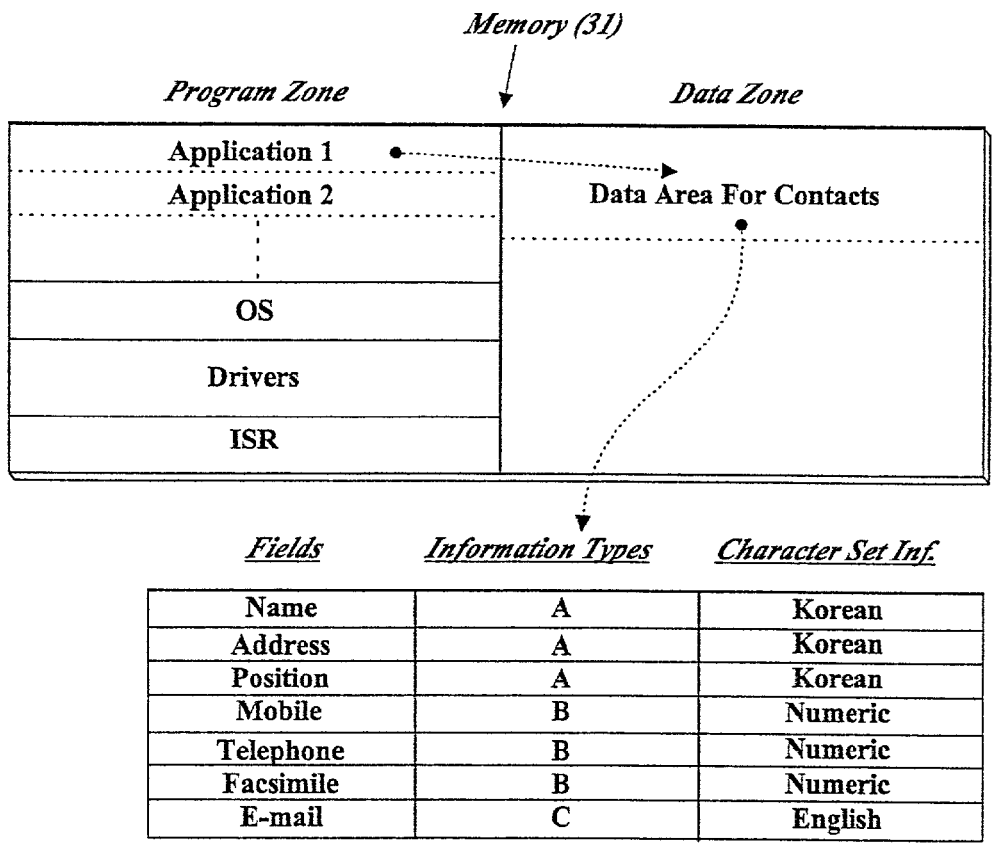
FIG. 4 shows an exemplary memory of which storage space is divided into two areas, one for programs and the other for data.

The memory 31 is preferably divided into two areas or zones, one for programs and the other for data as shown in FIG. 4. Character set indicating information for each field of all user data DBs is stored in the data zone, and various programs as well as an operating system basically running the portable information terminal are stored in the program zone.

Figure 5:
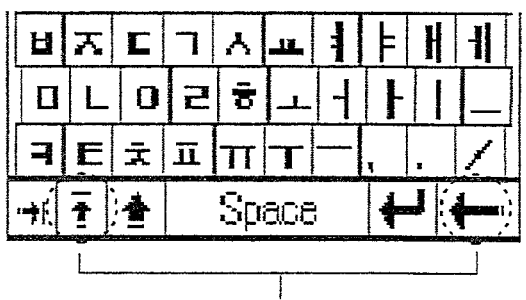
FIG. 5 illustrates an example of a soft keyboard composed of a Korean character set.
Figure 6:
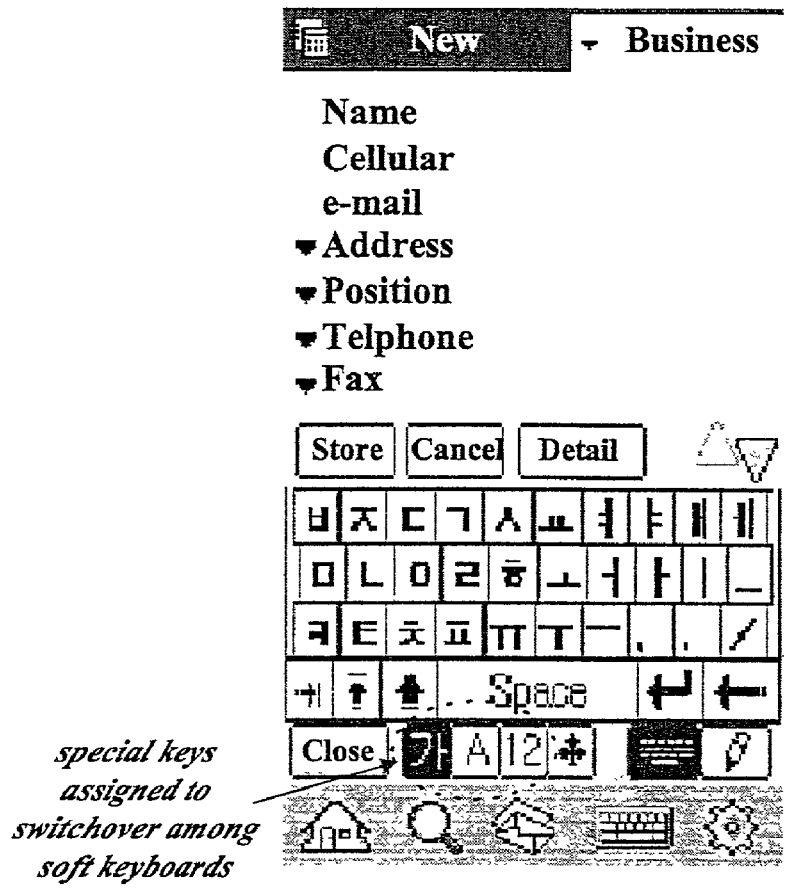
FIG. 6 shows an example of a full display on which a soft keyboard of Korean character set is outputted.

As shown in FIG. 3, after a process starts, if a user requests to create an information entry of a contact DB (Step S10), the controlling unit 30 executes a corresponding Application Program (AP) that displays an input window preferably including input fields of name, mobile phone, e-mail, address, position, telephone, facsimile, etc. on the touch screen 10 (Step S11). After displaying the input window, the AP moves an input cursor to a first input field, namely, the name field (Step S20). The application program searches the data zone of the memory 31 for a field matched with the current field the cursor is now placed in, and for example, finds that character set suitable to the current name field is Korean based on the stored information in connection with the found field. When selected, the AP outputs a soft keyboard composed of Korean character set such as shown in FIG. 5 to the displaying unit 12 (Step S21) after reading it from the first character set DB 50. The application program will search the data zone of the memory 31 again (Step S20), if unable to find a character set suitable to the current or selected input field, namely the name field. FIG. 6 shows an example of display output formed by operations described above.

When the Korean soft keyboard has been displayed in the new entry window for contact DB, data are entered one by one into the name field by the user by pressing suitable keys sequentially. For example, if a user wants to enter '강선주' in Korean then the following 'ㄱ,' 'ㅏ,' 'ㅇ,' 'ㅅ,' 'ㅓ,' 'ㄴ,' 'ㅈ, and ' ㅜare selected and pressed sequentially on the displayed Korean soft keyboard by a user to form the desired Korean characters.

If a user wants to enter English in the name field instead of Korean, the user presses a prescribed or special key on the touch pad 11 or key combination on the soft keyboard to switch soft keyboard to English (Step S30). When the prescribed key or key combination is used to switch soft keyboard, those keys are preferably pressed simultaneously or sequentially at a very short interval therebetween. When switchover of soft keyboard is requested, the controlling unit 30 can output a soft keyboard that is next in series after the Korean soft keyboard in a predefined switchover order (Step S31), after reading the new character from a corresponding character set (e.g., DB 51 or 52). If the predefined switchover order is 'Korean'→'Numeric'→'English', then, the English soft keyboard will be outputted by two switchover requests. After the English soft keyboard is displayed, a user can enter English name in the name field through sequential touches on desired keys.

In the meantime, whenever a user touches an arbitrary key of any soft keyboard, the touch detecting unit 20 sends xy coordinate value of the touched point calculated as described above to the controlling unit 30. Then, the controlling unit 30 searches the character set DB 50, 51, or 52, which have a character set suitable to the current name field, for a character code with xy coordinate value closest to the received xy coordinate value to identify which character of the character set has been entered (Step S41). If a character code is found among the character sets, the controlling unit 30 reads font data corresponding to the found character code and outputs it to the displaying unit 12, whereby a user can confirm a character he or she entered. Also, the controlling unit 30 stores the identified character in the name field as a new entry of a contact DB created for the user data DB 60 (Step S42). Preferably, such operations will be conducted repeatedly until next field of the contact DB is selected.

Figure 7:
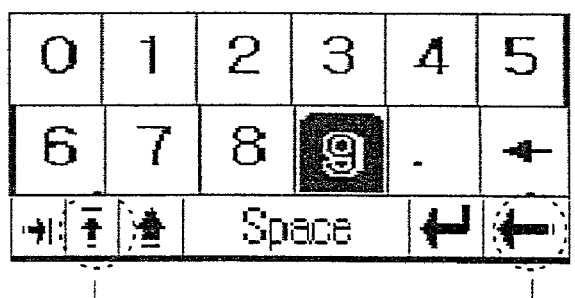
FIG. 7 illustrates a soft keyboard composed of a numeric character set.
Figure 8:
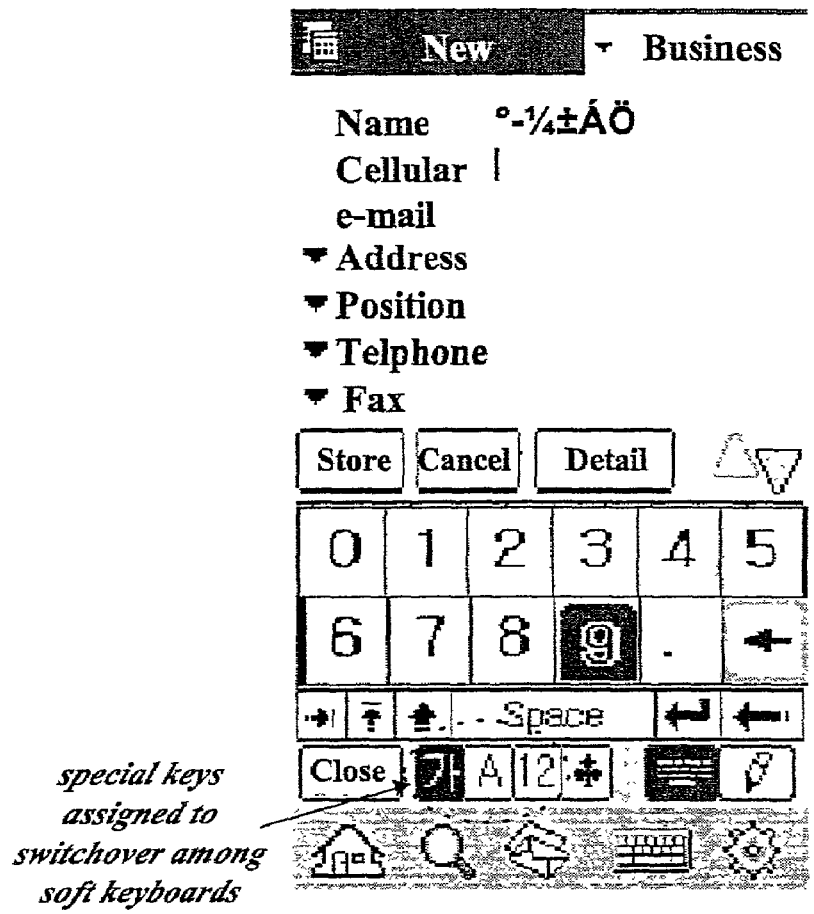
FIG. 8 shows an example of a full display on which a soft keyboard of numeric character set is outputted.

After the current field (e.g., name field) is filled with a desired information (e.g., name), the user selects a next field to enter information. If a user moves the cursor to the second field of 'cellular' or 'mobile' as shown in FIG. 8 (Step S40), the AP run by the controlling unit 30 confirms that possible character set to the mobile field is 'Numeric' after examining the data zone of the memory 31. Thus, the controlling unit 30 outputs the numeric soft keyboard composed of numeric characters as shown in FIG. 7 after reading the numeric character from the second character set DB 51. FIG. 8 shows an exemplary full display output formed by the procedures described above. After the numeric soft keyboard is displayed automatically by simply moving the cursor to the mobile field, a user can enter subscriber number of mobile communication system in the 'mobile' field through sequential touches on desired keys.

Figure 9:
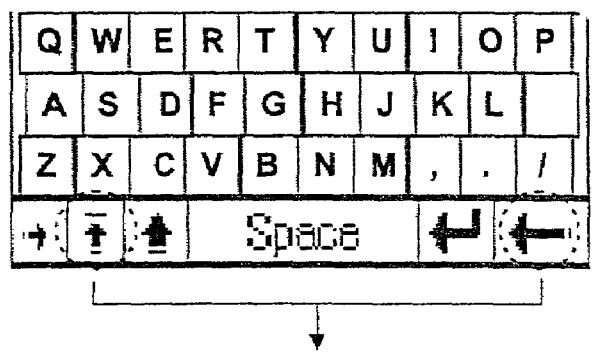
FIG. 9 illustrates a soft keyboard composed of an English character set.
Figure 10:
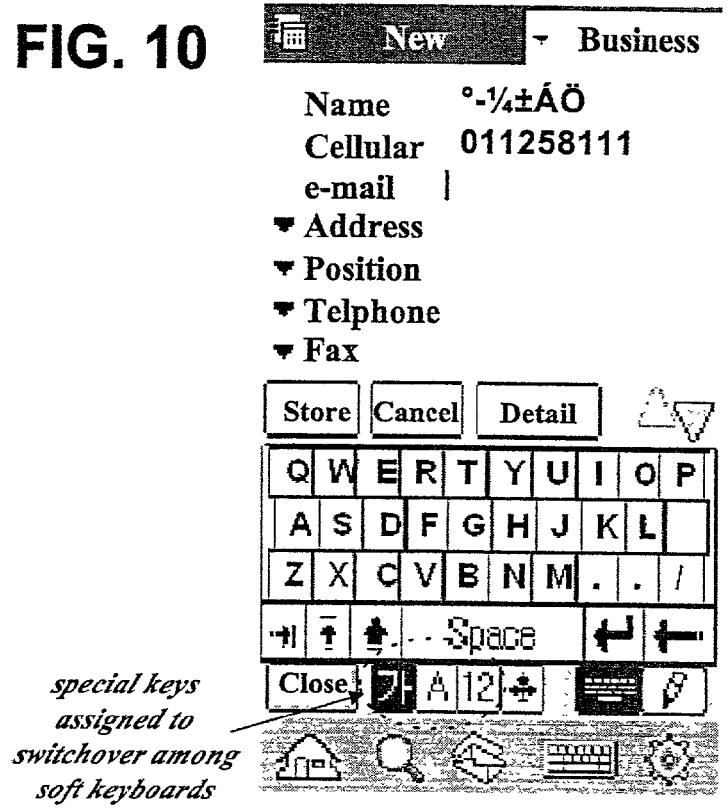
FIG. 10 shows an example of a full display on which a soft keyboard of English character set is outputted.

Similar to the above procedures, if a user moves the cursor to the 'e-mail' field after completing the 'mobile' field, the AP run by the controlling unit 30 confirms that possible character set to the e-mail field is 'English' after examining the data zone of the memory 31, and outputs the English soft keyboard composed of English characters as shown in FIG. 9 after reading the English character from the third character set DB 52. As a result, a full display window like FIG. 10 is provided onto the displaying unit 12. Thus, a user can enter an e-mail address in the 'e-mail' field through sequential touches on desired keys.

Figure 11:
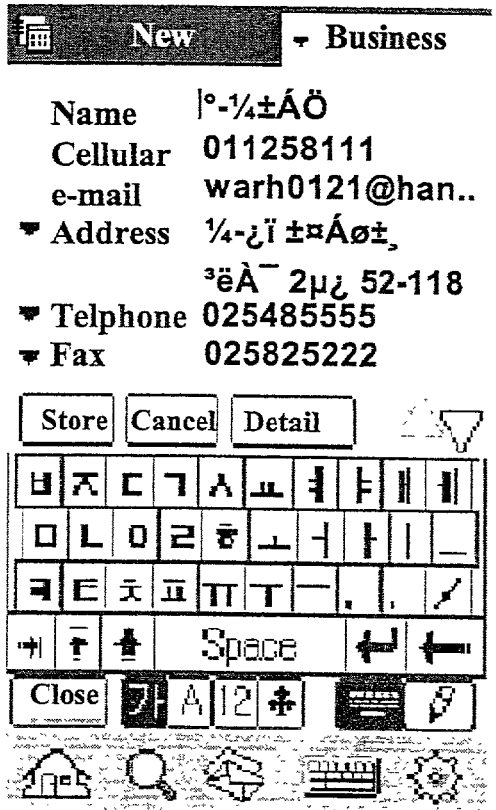
FIG. 11 shows a display output in which information for an entry is complete.

Owing to the above-described key input assisting method, a user can enter all information in every field of an entry of a contact DB conveniently and in less time without any manual switchover to other suitable soft keyboard for a current input field (Step S50). Further, data search time and processing can be reduced. When each field is complete, the process ends. Otherwise, control returns to enter data for the next input field selected (Step S20). FIG. 11 shows an illustrative window in which all information for an entry is completely filled. The controlling unit 30 stores all information entered for an entry in respective data fields of a contact DB allocated in the user data DB 60. All field data entered for an entry are preferably linked together by the entry number or the like assigned to that entry.

After many entries of the contact DB are created and stored in the user data DB 60 in accordance with the above described method, a user can request entry search after executing the contact DB managing AP. The AP run by the controlling unit 30 preferably searches the contact DB stored in the user data DB 60 for an entry that has a field with data matched exactly or partially with the entered data in the same field on an input window by a user, and displays all field data found on the entry.

In the preferred embodiments described above, information necessary to each field is entered through touches on keys of a soft keyboard. However, such information may be entered through handwriting on the touch screen 10 or the like instead. While a user writes a character on the touch screen 10, the controlling unit 30 delivers the collection, gathered during user's handwriting, of calculated xy coordinate values and the number of strokes detected by the touch detecting unit 20 to the written-pattern identifying unit 40. Then, the written-pattern identifying unit 40 selects only one set of characters as a search target among all possible character sets, instead of searching all handwritten character sets. Namely, the written-pattern identifying unit 40 preferably selects one handwritten character set, of which character type can be entered as information of a current data field, as a search target. For example, if a current field is 'name', the written-pattern identifying unit 40 selects the first separated area as a search target because character type of the name field is assigned to Korean. The identifying unit 40 preferably searches only the first area or a smaller user defined area of the written-style character DB 41 to find stored pattern data with the same number of strokes in a character and most similar to configuration formed by the collection of xy values. Since searching information is relatively small, the time required for identifying a written character and the chance of mismatching the pattern data are extremely low.

As described above preferred embodiments according to the present invention have various advantages. Preferred embodiments of data input assisting method and apparatus in accordance with the present invention ensure fast and convenient data input work with a portable information terminal not capable of providing Korean, English, and Numeric keyboard concurrently in a case that Korean, English, or Numeric data must be selected to match character type of each data field before entering data in that data field.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for data input to a portable information terminal, comprising:
    displaying an input window including a plurality of input fields when data input is requested;
    identifying which character set of a plurality of different character sets is suitable to a selected input field on the displayed input window; and
    providing a data input screen including the identified character set in response to designation of the selected input field, wherein each of the plurality of character sets has a plurality of mutually exclusive characters, wherein more than two different character sets are directly provided to the user individually corresponding to each one of more than two input fields in the displayed input window, wherein a determination of said individually corresponding character sets to said each one of the more than two input fields in the displayed input window is modified by said user, and wherein upon each subsequent selection of each input field said user modified individually corresponding character set is provided.

2. The method of claim 1, further comprising storing data entered through the provided data input screen as information of the selected input field.

3. The method of claim 1, wherein the data input screen is a soft keyboard displayed on a displaying unit of the portable information terminal.

4. The method of claim 3, wherein the soft keyboard has at least one key defined to change among more than two character sets, and a next character set is sequentially provided as the soft keyboard according to a predefined switchover order whenever said at least one key is selected.

5. The method of claim 1, wherein the plurality of character sets include English, Numeric, and non-English character set, and wherein the input fields require data from the plurality of character sets.

6. The method of claim 1, wherein said data input is conducted when a user performs information entry of personal contact information for said user.

7. The method of claim 1, comprising:
    separately storing a plurality of different written-style language character sets, wherein the plurality of different character sets include the plurality of different written-style language character sets;
    entering data in the selected input field on the displayed input window, the data including a plurality of written-style strokes forming each character;
    limiting a character recognition search to only one of the separately stored written-style language character sets corresponding to the suitable character set when the suitable character set is a written-style language character set; and
    displaying an identified character corresponding the written-style character on the input display window as a result of the search.

8. A method for data input to a portable in formation terminal, comprising:
    separately storing a plurality of different written-style language character sets;
    displaying an input window including a plurality of input fields when data input is requested;
    identifying which character set among a plurality of different character sets is suitable to a selected input field on the displayed input window
    wherein the plurality of different character sets include the plurality of different written-style language character sets;
    wherein each of the plurality of written-style language character sets has a plurality of mutually exclusive characters;
    entering data in the selected input field on the displayed input window, the data including a plurality of written-style strokes forming each character;
    limiting a character recognition search to only one of the separately stored written-style language character sets corresponding to the suitable character set when the suitable character set is a written-style language character set;
    displaying an identified character corresponding to the written-style character on the input display window as a result of the search; and
    wherein corresponding selected input fields are configured to be selectively assigned each of two or more of the different character sets, wherein a current one of the selectively assigned plurality of different character sets is directly displayed for the selected input field, wherein said current assigned character set for said selected input field is modified by a user, and wherein said user modified current character set is displayed and used for data entry upon each subsequent selection of the selected input field.

9. The method of claim 8, further comprising:
    identifying which character is entered through comparing said entered character with all characters included in the limited search target; and
    storing the identified character as information of the selected input field.

10. The method of claim 8, further comprising:
    selecting the input field among the plurality of input fields; and
    providing a data input screen including the identified character set to a user directly in response to selection of the selected input field.

11. The method of claim 8, comprising:
    storing the written-style strokes each with a prescribed code, wherein said each written-style stroke is determined by a comparison made to a written-style character database being the identified handwriting character set.

12. The method of claim 8, wherein each of the plurality of character sets has a plurality of mutually exclusive characters, and wherein said identifying and limiting sets are directly performed without additional user action upon selection of a next input field on the displayed input window.

13. An apparatus of data input to a portable information terminal, comprising:
    display means for displaying an input window including a plurality of selectable input fields when data input is requested;
    storing means for storing information on which character set among a plurality of character sets is suitable to each of the input fields;

wherein each of the plurality of character sets has a plurality of mutually exclusive characters; and controller means for identifying a suitable character set for a selected input field on the displayed input window based on the information stored in said storing means, and displaying a data input screen including the identified character set in said display means, wherein said data input screen has a single key defined to sequence among more than two character sets, wherein said controller means sequentially provides a next character set as a current character set in the data input screen according to a predefined sequence whenever said single key is selected to implement a user changed correspondence between said selected input field and said suitable character set, and wherein said user changed correspondence is reflected in later entries in said selected input field.

14. The apparatus of claim 13, wherein said controller means further stores data entered through the displayed data input screen for the selected input field as information of the selected input field, and wherein said single key is followed or operated in combination with a second key or a prescribed key sequence, wherein corresponding selected input fields are configured to be selectively assigned each of two or more of the different character sets, and wherein a current one of the selectively assigned plurality of different character sets is directly displayed for the selected input field.

15. The apparatus of claim 13, wherein the data input screen is a soft keyboard, and wherein the data input screen is directly displayed by the controller means according to selection of the selected input field.

16. The apparatus of claim 13, wherein the character sets include a plurality of language character sets and a Numeric character set.

17. An apparatus of data input to a portable information terminal, comprising:
a display that displays an input window including a plurality of input fields when data input is requested;
a storing device that stores information on which character set among a plurality of different character sets is suitable to each of the input fields; and
a controller that identifies which character is entered in a selected input field through searching and comparing an entered character with characters stored in said storing device, and stores the identified character as a piece of information of an input field selected in the input window, wherein each of the plurality of character sets has a plurality of mutually exclusive characters, wherein corresponding selected input fields are configured to be selectively assigned each of two or more of the different character sets, wherein a current one of the selectively assigned plurality of different character sets is directly displayed for the selected input field, wherein said current assigned character set for said selected input field is modified by a user, and wherein upon each subsequent selection of the selected input field said user modified current character set is displayed and used for data entry.

18. The apparatus of claim 17, wherein said storing device has respective separate areas for English, Numeric, and each non-English character set, and wherein said controller identifies the entered character by searching one corresponding character set suitable for the selected input field in one separate area of the storing device, and wherein the input fields require data from the plurality of character sets.

19. The apparatus of claim 17, wherein the input fields require data from more than two of the plurality of character sets.

20. The apparatus of claim 17, wherein each character set has a single key defined to sequence among more than two character sets, and wherein said controller means sequentially provides a next character set as a current character set in the input window according to a predefined sequence whenever said single key is selected.

21. The apparatus of claim 20, wherein the character sets include a plurality of written-style character sets.

* * * * *